Sept. 25, 1928. 1,685,610
C. T. MORSE
HEATING AND VENTILATING APPARATUS
Filed Feb. 28, 1927   5 Sheets-Sheet 1
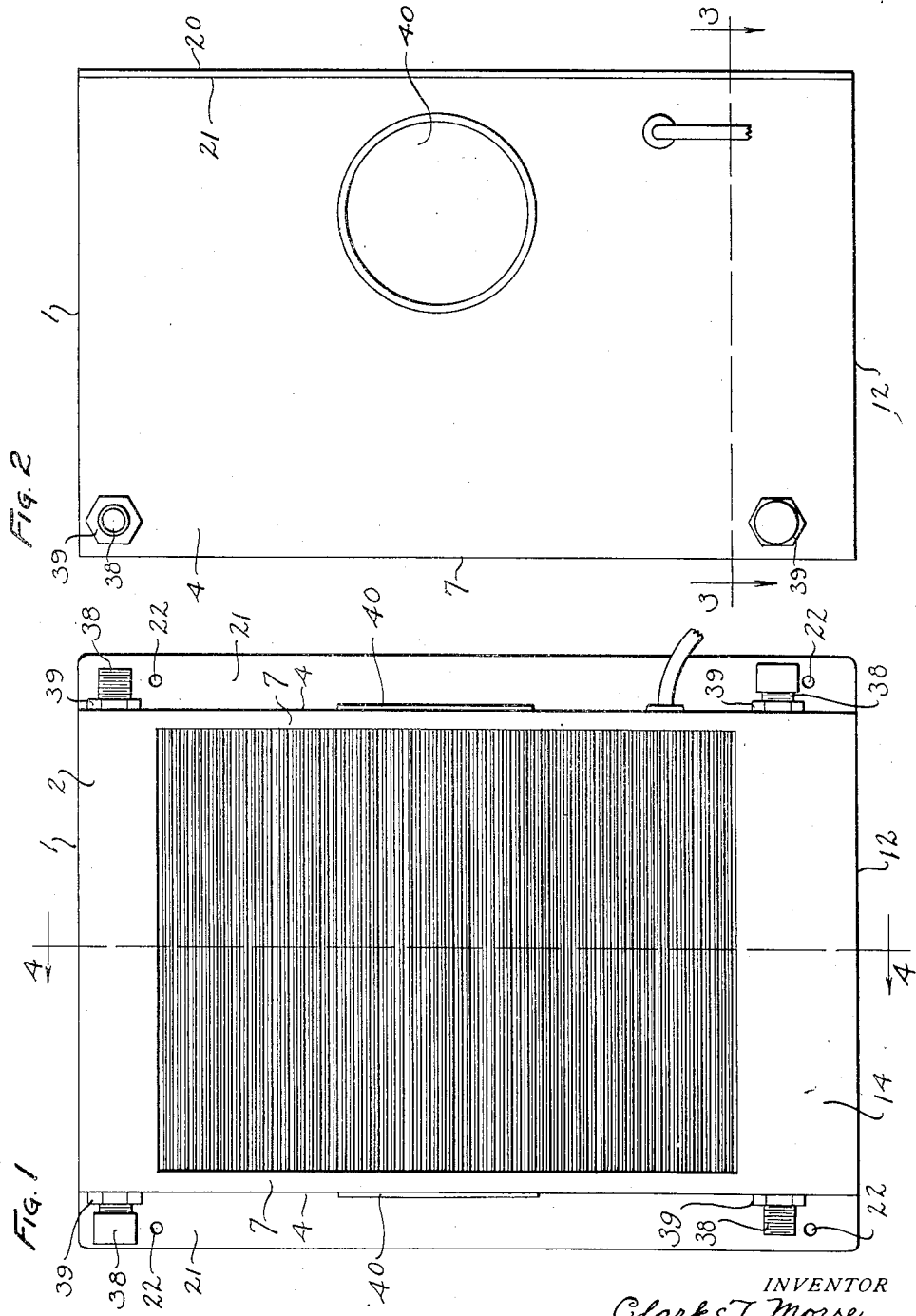
INVENTOR
Clark T. Morse
BY Toulmin & Toulmin,
ATTORNEY

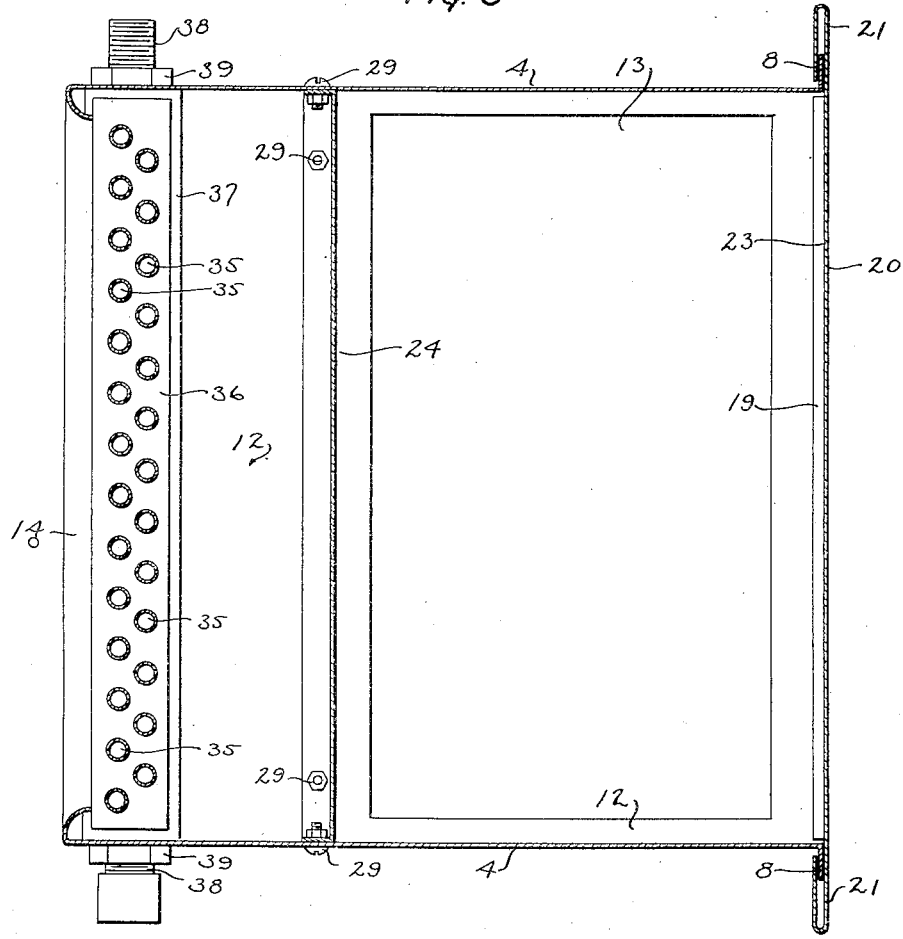

Sept. 25, 1928. 1,685,610
C. T. MORSE
HEATING AND VENTILATING APPARATUS
Filed Feb. 28, 1927   5 Sheets-Sheet 3
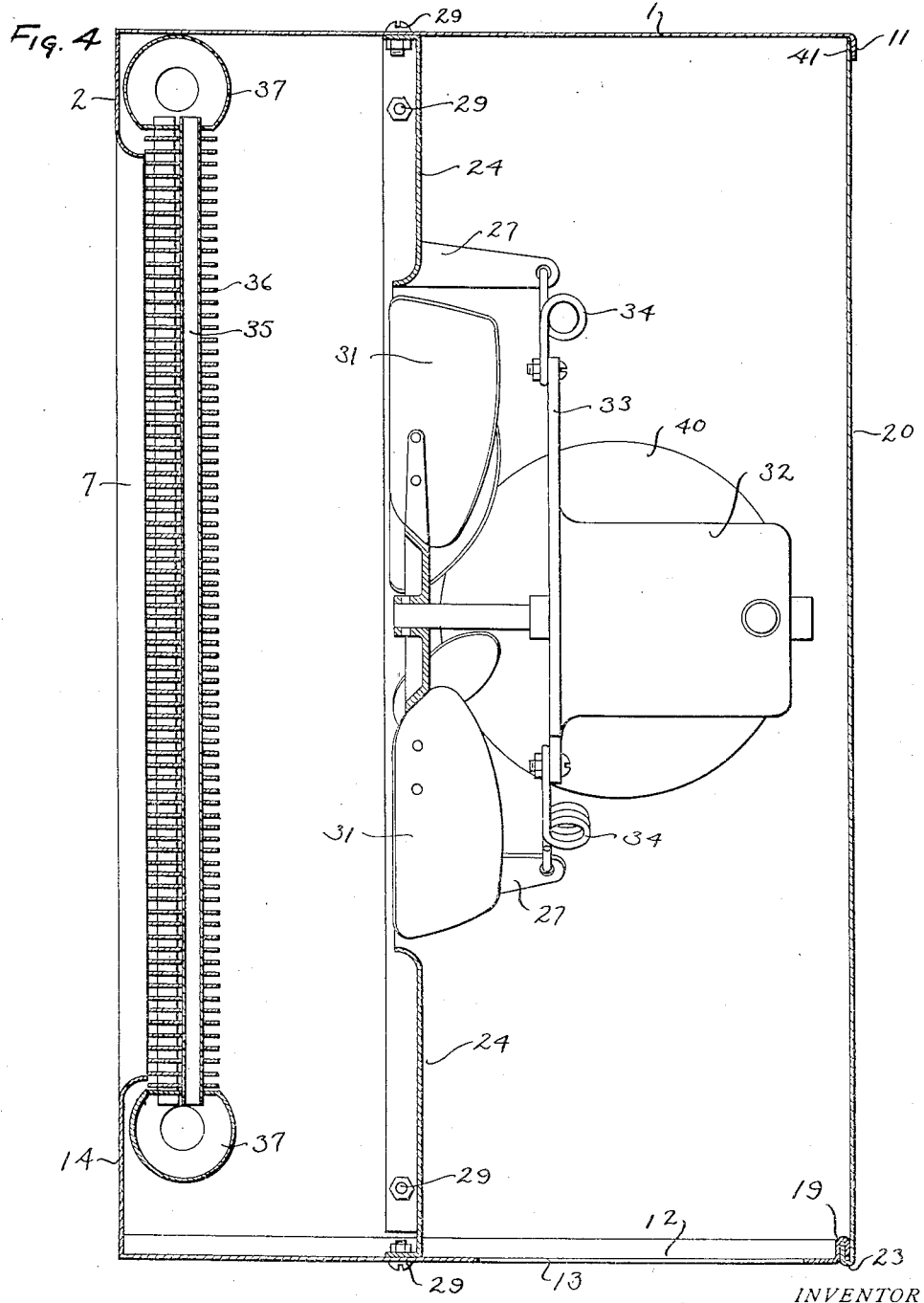
INVENTOR
Clark T. Morse
BY Toulmin & Toulmin,
ATTORNEY

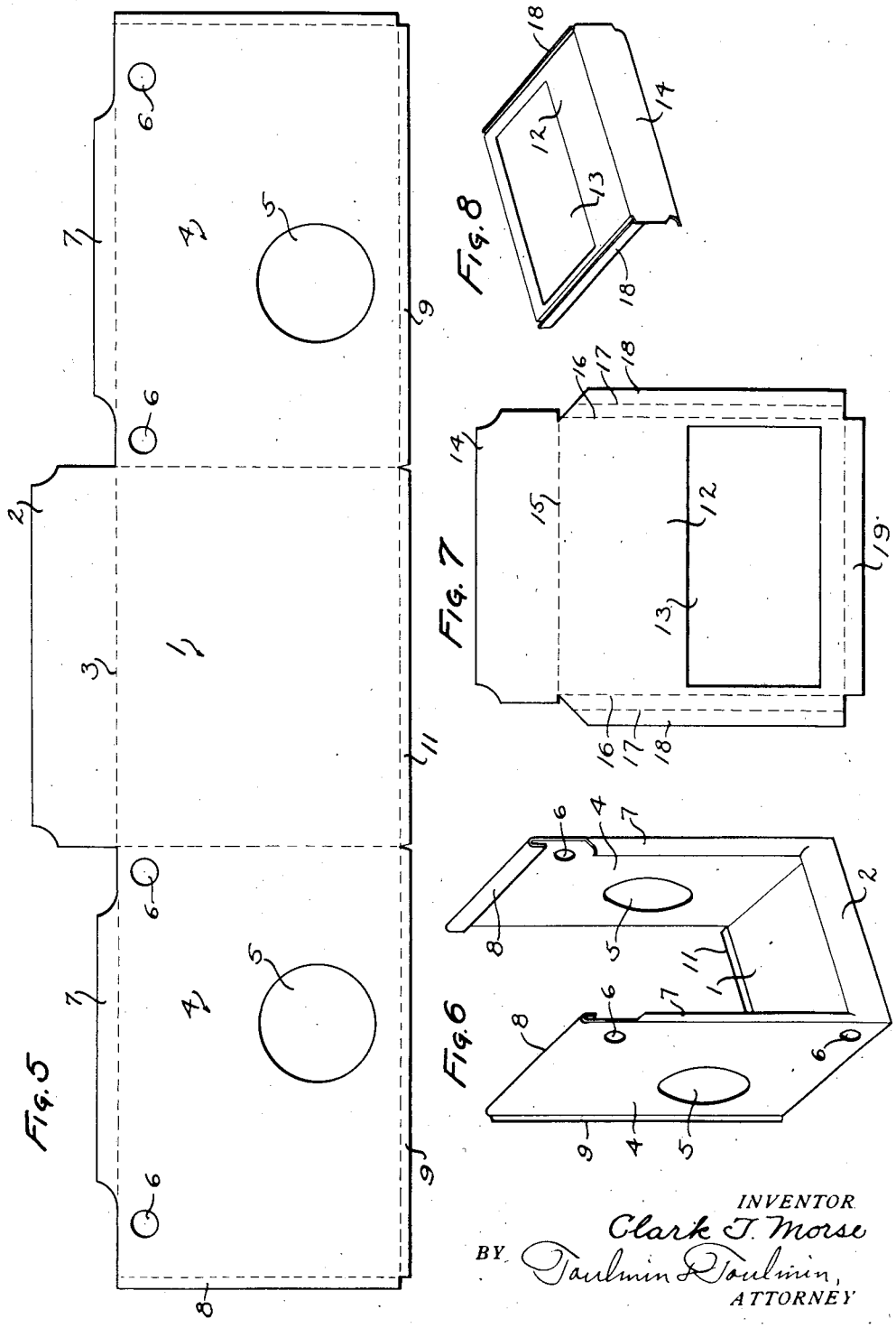

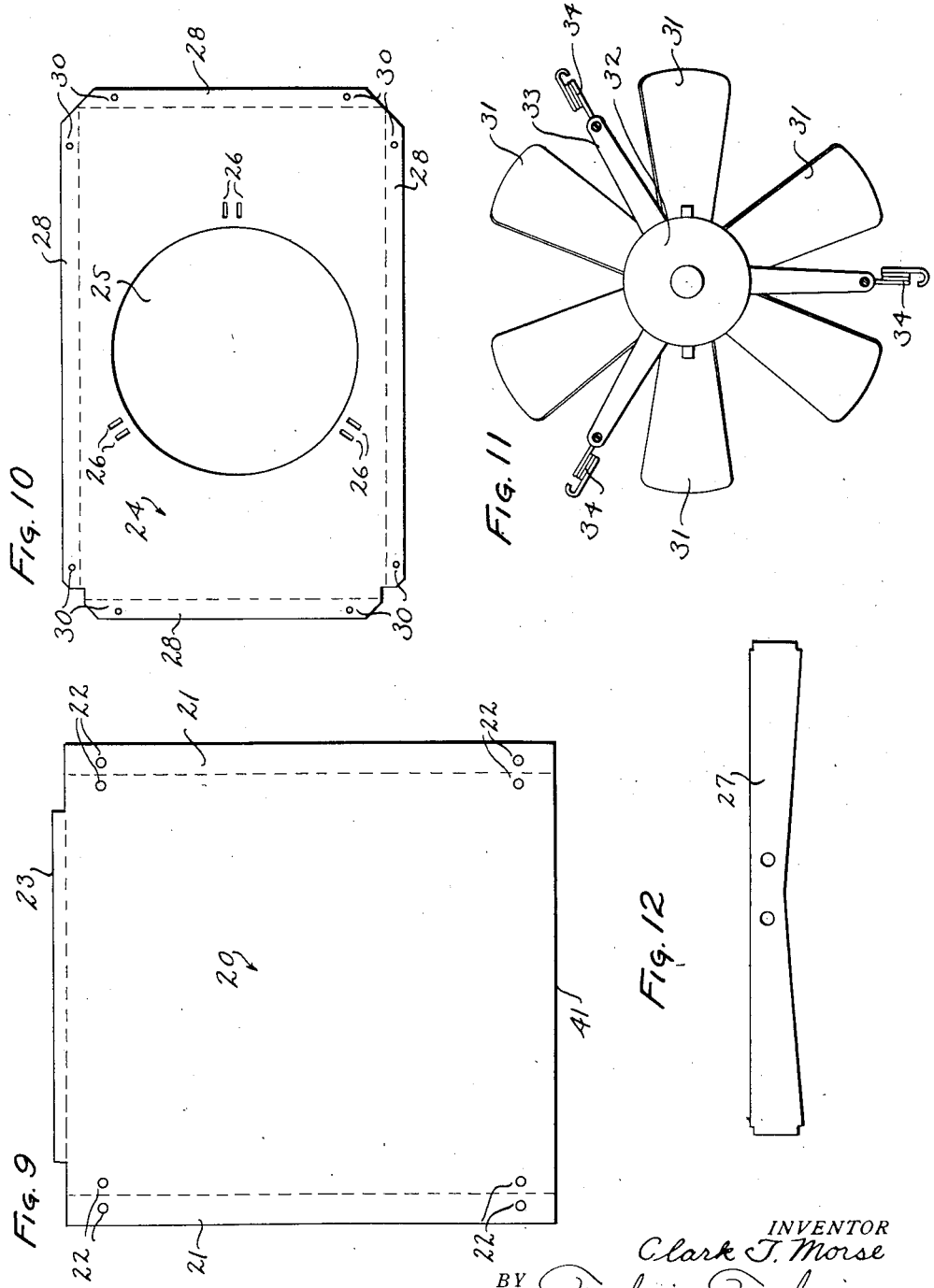

Patented Sept. 25, 1928.

1,685,610

UNITED STATES PATENT OFFICE.

CLARK T. MORSE, OF DETROIT, MICHIGAN, ASSIGNOR, BY MESNE ASSIGNMENTS, TO AMERICAN BLOWER CORPORATION, OF DETROIT, MICHIGAN, A CORPORATION OF DELAWARE.

HEATING AND VENTILATING APPARATUS.

Application filed February 28, 1927. Serial No. 171,706.

My invention relates to a heating and ventilating apparatus.

The object of my invention is to provide a compact unitary structure capable of being manufactured in large quantities so that the parts are interchangeable, of standard width to fit into standard building constructions, noiseless and capable of delivering the maximum of heat and ventilation for the radiation provided.

It is a further object to provide a structure which is very rigid while at the same time made out of simple parts requiring the minimum of die work for their formation.

It is the object of my invention to provide a unitary casing, completely enclosed, of a size adaptable to go between the standard spacing of studding or other building supports and so enclosed that its moving parts and heated parts will present the minimum of opportunity of causing damage or injury to an operator, particularly in domestic installations.

It is a further object to provide a unitary structure in which the sliding cover will add strength and rigidity to the assembly and in which a spring supported fan, in a fan compartment, is so arranged as to distribute the air moved thereby over a radiator which not only provides radiation but also diffusion members so that there will be a uniform distribution of heated air making its exit from the structure of my invention.

Referring to the drawings,

Fig. 1 is a front elevation of the complete outfit from the radiator side;

Fig. 2 is a side elevation thereof;

Fig. 3 is a section on the line 3—3 of Fig. 2;

Fig. 4 is a section on the line 4—4 of Fig. 1;

Fig. 5 is a plan view of the blank forming three walls of the unitary structure;

Fig. 6 is an inverted perspective view of the blank formed into final position;

Fig. 7 is a plan view of the bottom wall blank;

Fig. 8 is an inverted perspective view of the bottom wall formed into final shape;

Fig. 9 shows in full view the unfolded blank for the rear cover slide;

Fig. 10 shows the unfolded blank for the fan partition;

Fig. 11 is a rear elevation of the spring supported fan which is supported by the fan partition;

Fig. 12 is a blank of the fan supporting finger.

Referring to the drawings in detail; and in particular to the blanks from which the casing is made, there will be observed in Fig. 5 a continuous strip of metal consisting of the following parts. A central section 1 is provided with a front radiator retaining flange 2 which is adapted to be bent at right angles along the line 3 with respect to the section 1 which becomes the top section. On either side of the top section are side sections 4 having hand holes 5 and radiator pipe holes 6. The forward edge of each side section is provided with a radiator guard flange 7, side flange 8, and rear supporting flange 9. The rear supporting flange 9 is of similar character and bent along a similar line as the inwardly turned flange 11 of the top section 1. An interlocking bottom section is shown in Fig. 7, designated 12, having a rectangular opening 13. This section 12 carries a radiator retaining flange 14 bent at right angles to the plate 12 along the line 15. Slides are formed on either side of the plate 12 by the double folding along the lines 16 and 17 of the section 18. A flange is also provided on the edge of the plate 12 opposite to the retaining flange 14, such flange being designated 19.

The rear cover plate which is adapted to slide on and off the cabinet formed from the parts just described consists of a cover plate portion 20 having sides 21 adapted to be turned over into U shaped portions, such sides having bolt holes 22 through which bolts may be passed to attach the sliding cover to the cabinet. On the rear wall of the plate 20 is formed a flange 23 which is formed at right angles thereto in order to limit the movement of the sliding cover 20.

In Fig. 10 will be found the blank for the fan partition consisting of a plate 24 having a fan opening 25 and a plurality of spaced slots 26 for receiving the fan supporting fingers 27, the blank for which is shown in Fig. 12. This fan partition is provided with flanges 28 which are turned at right angles to the fan partition and are fastened by bolts 29 through bolt holes 30 to the walls of the cabinet.

The fan 31 driven by the motor 32 is supported by the motor arms 33 which are connected by the springs 34 to the arms 27 on the fan partition plate 24.

The opening in the front of the cabinet formed by the inwardly turned flanges 2, 7 and 14 is filled by a radiator whose tubes are arranged crosswise of the opening so formed, such tubes being designated 35 and having thereon a plurality of relatively straight fins 36 arranged at spaced intervals on the tubes and parallel to the direction of movement of the air impelled over the tubes by the fan 31. These tubes are mounted in circular headers 37, the ends of which are connected to supply exit pipes 38 that pass through the walls of the cabinet and are retained in position by the nuts 39. The openings 5 are closed by detachable covers of any desired character such covers being designated 40.

The portion of the plate 12 which engages with the sidewalls 4 is braced thereto particularly along the line of structure of the section 14 therewith.

The slidable cover 20 has its edge 41 located beneath the inwardly turned flange 11. The turned over end 23 is adapted to engage the flange 19 of the plate 12 so that an interlocking engagement is formed.

*Assembly.*

It will be noted that the cabinet is formed by assembling a top portion and side portions from a single piece, that the bottom section is formed by utilizing interlocking flanges 8 and 18, consisting of turned over U shaped edges, while the rear cover is slidably mounted on the outwardly turned flanges of the sides, such flanges being numbered 8 and the inwardly turned grooved sides of the cover being designated 21.

It will be understood that I desire to comprehend within my invention such modifications as may be necessary to adapt it to varying conditions and uses.

Having thus fully described my invention, what I claim is new and desire to secure by Letters Patent, is:—

1. In combination, a cabinet having integral top and side sections and radiator guard flanges, a radiator supported by and connecting said side sections, a detachable bottom section connecting said side sections having a radiator guard completing the radiator opening between the guards, and a slidable cover connecting the rear walls of said side sections.

2. In combination, a cabinet having integral top and side sections and radiator guard flanges, a radiator supported by and connecting said side sections, a detachable bottom section connecting said side sections having a radiator guard completing the radiator opening between the guards, a slidable cover connecting the rear edges of said side sections, and a partition interposed between the walls of said cabinet having an opening therein.

3. In combination, a cabinet having integral top and side sections and radiator guard flanges, a radiator supported by and connecting said side sections, a detachable bottom section connecting said side sections having a radiator guard completing the radiator opening between the guards, a slidable cover connecting the rear edges of said side sections, a partition interposed between the walls of said cabinet having an opening therein, a fan suspended in said opening and a radiator located behind said guard flanges with its headers concealed thereby.

4. In a cabinet, an integral one-piece construction forming the top and sidewalls and radiator guard flanges, the free ends of said sidewalls having interlocking flanges, a slidable bottom section having cooperating interlocking flanges and a radiator guard and a slidable cover having interlocking flanges for slidably engaging the edges of the side sections.

5. In a cabinet, an integral one-piece construction forming the top and sidewalls and radiator guard flanges, the free ends of said sidewalls having interlocking flanges, a slidable bottom section having cooperating interlocking flanges and a radiator guard and a slidable cover having interlocking flanges for slidably engaging the edges of the side sections, and a detachably mounted apertured partition in said cabinet having the aperture therein in line with the aperture formed by the radiator guards, said cabinet having an air inlet opening on the other side of said partition opposite to the opening formed by the radiator guards.

6. In a cabinet, an integral one-piece construction forming the top and sidewalls and radiator guard flanges, the free ends of said sidewalls having interlocking flanges, a slidable bottom section having cooperating interlocking flanges and a radiator guard and a slidable cover having interlocking flanges for slidably engaging the edges of the side sections, and a detachably mounted apertured partition in said cabinet having the aperture therein in line with the aperture formed by the radiator guards, said cabinet having an inlet opening on the other side of said partition opposite to the opening formed by the radiator guards, arms projecting at an angle to said partition and mounted thereon, yielding means supported by said arms, and a motor and fan mounted on said yielding means and a radiator mounted in the opening formed by the radiator guards.

7. In a cabinet, an integral one-piece construction forming the top and sidewalls and radiator guard flanges, the free ends of said sidewalls having interlocking flanges, a slidable bottom section having cooperating interlocking flanges and a radiator guard and a slidable cover having interlocking flanges for slidably engaging the edges of the side sections, and a detachably mounted apertured partition in said cabinet having the aperture therein in line with the aperture formed by the radiator guards, said cabinet having an inlet opening on the other side of said partition opposite to the opening formed by the radiator guards, arms projecting at an angle to said partition and mounted thereon, yielding means supported by said arms, and a motor and fan mounted on said yielding means and a radiator mounted in the opening formed by the radiator guards, said slidable cover being arranged to interlock with the walls of the cabinet to lock them together.

In testimony whereof I affix my signature.

CLARK T. MORSE.